United States Patent [19]
Bustamante et al.

[11] Patent Number: 5,748,610
[45] Date of Patent: May 5, 1998

[54] MULTI-APPLICATION WIRELESS DIRECT SEQUENCE SPREAD SPECTRUM DIGITAL CELLULAR TELEPHONE SYSTEM

[75] Inventors: Herman A. Bustamante, Millbrae; Horen Chen, Saratoga, both of Calif.

[73] Assignee: Stanford Telecommunications, Inc., Sunnyvale, Calif.

[21] Appl. No.: 436,905

[22] Filed: May 8, 1995

[51] Int. Cl.$^6$ .................................................. H04T 11/00
[52] U.S. Cl. ............................................ 370/208; 370/342
[58] Field of Search ................................. 370/17, 18, 19, 370/79, 208, 209, 320, 335; 375/200, 205, 208; 455/50.1, 54.1, 63, 67.1, 69

[56] References Cited

U.S. PATENT DOCUMENTS

| | | | |
|---|---|---|---|
| 4,494,228 | 1/1985 | Gutleber | 370/18 |
| 5,509,002 | 4/1996 | Baden et al. | 370/18 |
| 5,613,191 | 3/1997 | Hylton et al. | 370/342 |

*Primary Examiner*—Benedict V. Safourek
*Assistant Examiner*—Ajit Patel
*Attorney, Agent, or Firm*—Jim Zegeer, Esq.

[57] ABSTRACT

A wireless OCDMA communication system in which there is a cluster of base stations (BS), or radio fixed parts (RFP), which may in turn be controlled by a wireless cluster controller (WCC). The system uses frames of a time division duplex spread spectrum signal for two-way voice and/or data transmission, and a plurality of handsets, portable parts (PPs), or more complex subscribers, each adapted to communicate with the BS, or RFP, using the communication system, can be used to implement a variety of system configurations and provide a variety of at least two levels of service selected from a wide variety of services.

1 Claim, 6 Drawing Sheets

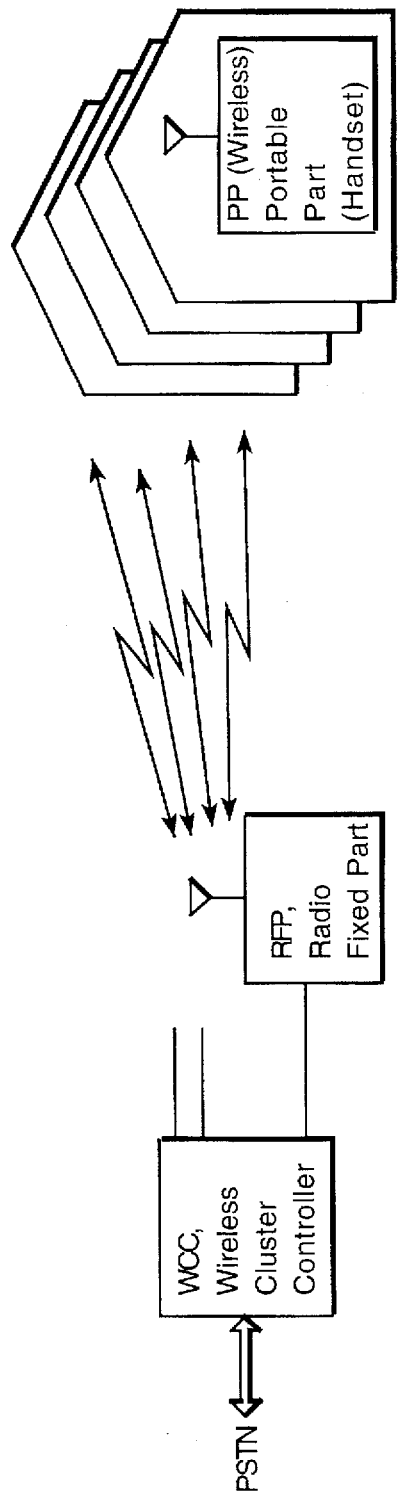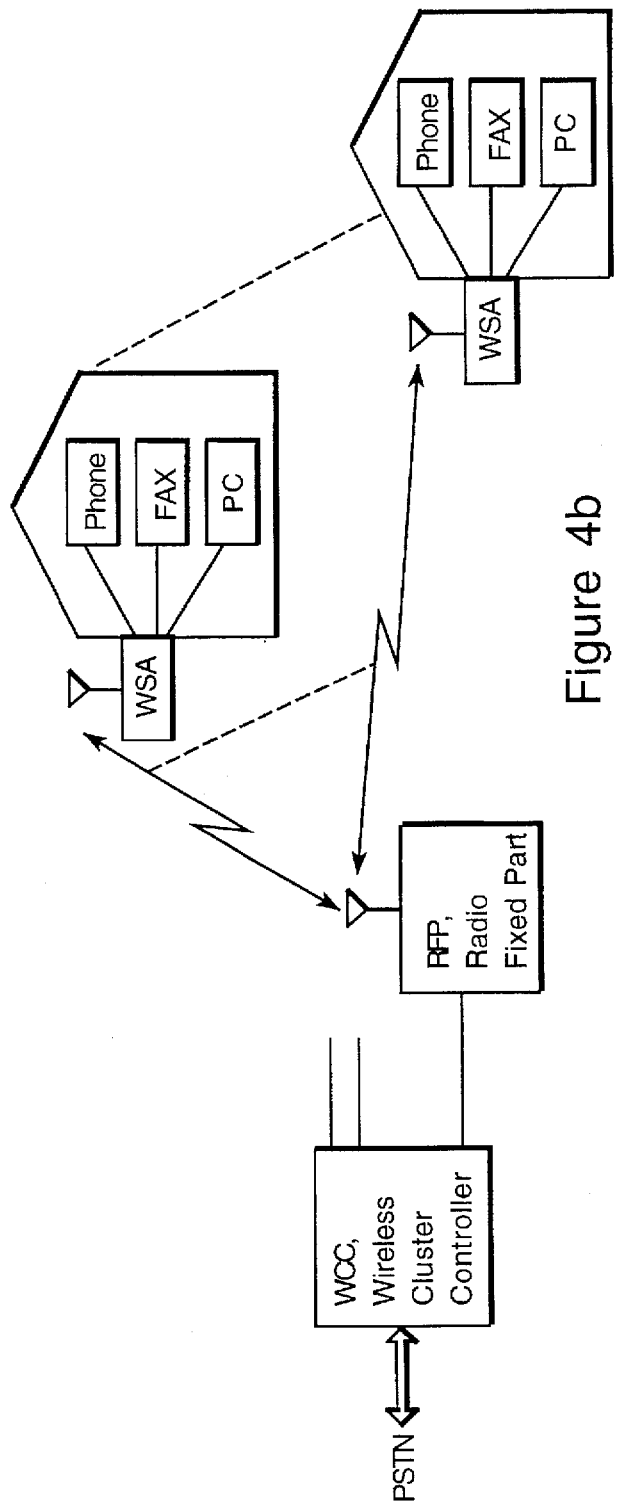
Figure 4a
Figure 4b 5,748,610

MULTI-APPLICATION WIRELESS DIRECT SEQUENCE SPREAD SPECTRUM DIGITAL CELLULAR TELEPHONE SYSTEM

REFERENCE TO RELATED APPLICATIONS

This application is related to application Ser. No. 08/257/324, filed Jun. 7, 1994 and entitled "WIRELESS DIRECT SEQUENCE SPREAD SPECTRUM DIGITAL TELEPHONE SYSTEM", which is a continuation-in-part of application Ser. No., 07/980,957, filed Dec. 20, 1994 and entitled "WIRELESS DIRECT SEQUENCE SPREAD SPECTRUM DIGITAL CELLULAR TELEPHONE SYSTEM", now U.S. Pat. No. 5,375,140, all of which are incorporated herein by reference.

BACKGROUND AND BRIEF DESCRIPTION OF THE INVENTION

A telephone system can be implemented in many different configurations and using a broad range of design parameter values. The techniques referred to in the above-identified application are all based on the concept of using orthogonal code division multiple access (OCDMA) techniques and dual polarization diversity antennas in the portable parts (PP) or handsets for wireless telephone system applications. This invention describes the breadth of applicability of the above referred to inventions and some of the many and varied forms the system configuration may take.

DESCRIPTION OF THE DRAWINGS

The above and other objects, features and advantages of the invention will become more apparent when considered with the following specification and attached drawings wherein:

FIG. 4A is a block diagram of a wireless OCDMA local loop incorporating the invention for use in a high density urban area, FIG. 4B is a block diagram of a wireless OCDMA local loop incorporating the invention for use in a low density suburban area.

DETAILED DESCRIPTION OF THE INVENTION

Figure 1:
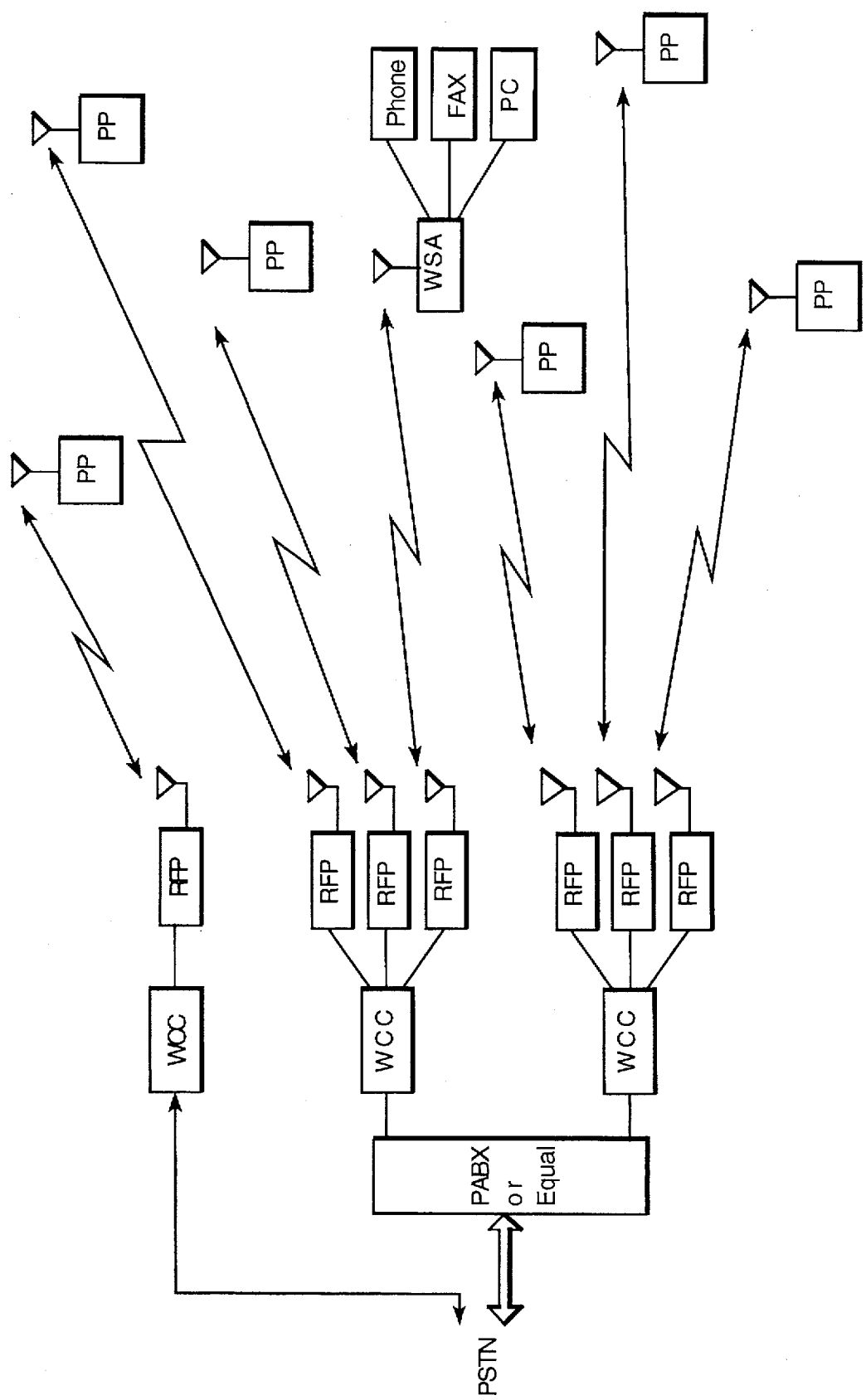
FIG. 1 is a generalized block diagram of a wireless OCDMA system configuration incorporating the invention.

FIG. 1 Illustrates a number of uses to which the basic concept can be applied. For example, it is shown that for systems implemented using the OCDMA techniques disclosed in the above applications:

1) Direct or indirect access to the public switched telephone network (PSTN) can be provided,
2) Single user or multiple user systems can be implemented,
3) Single cell or multiple cell systems can be provided wherein a radio fixed part RFP (base station) supports all users in a given cell said cell being defined by an approximate geographical boundary,
4) Direct or indirect access (via wireless links) to a PBX can be provided, and
5) Different levels of communication service can be provided, e.g., voice only, voice and FAX, voice and/or FAX and PC interface, etc.

Each of these applications is expanded upon below to show in greater detail the capabilities, services, and alternate system implementations which can be provided using the subject matter of the above referenced applications and patents. In particular, it is shown below how these can be used in the following applications:

1) Residential, small user, intra-office applications, including key systems,
2) Inter-Office systems, wide area networks (WAN), and Telepoint system applications,
3) Wireless local loop systems,
4) Satellite system applications, and
5) Wireless cable television distribution systems.

The basic elements of the various systems to be described below are illustrated in FIG. 1 and can be described as follows. The service area for any wireless system, regardless of how small or large it may be in total coverage, can be described as consisting of a group or groups of cells. A cell is defined by an approximate geographical area containing the users or subscribers to be serviced by the given cell. The subscribers may consist of a single telephone user handset or portable part PP, or it may be a large number of subscribers, some of whose communication requirements demand more than just plain old telephone service (POTS).

Each cell is serviced by a base station BS, or radio fixed part RFP. This BS or RFP provides the RF links to/from the subscribers. Cells are defined as members of a group of cells here defined as clusters of cells. These clusters of cells are in turn serviced by a wireless cluster controller WCC which provides the interface to the PBX and thence to the PSTN.

It will be noted that when the subscriber has communication requirements beyond that of telephone service a wireless subscriber interface adapter (WSA is required at the subscriber facility to properly receive and process the composite data signal received at the subscriber. The case illustrated in FIG. 1 shows a subscriber receiving voice, FAX and PC interface service, thereby requiring the use of a WSA in order to properly receive and process the individual signals.

Residential, Small User, Intra-Office Applications

Figure 2:
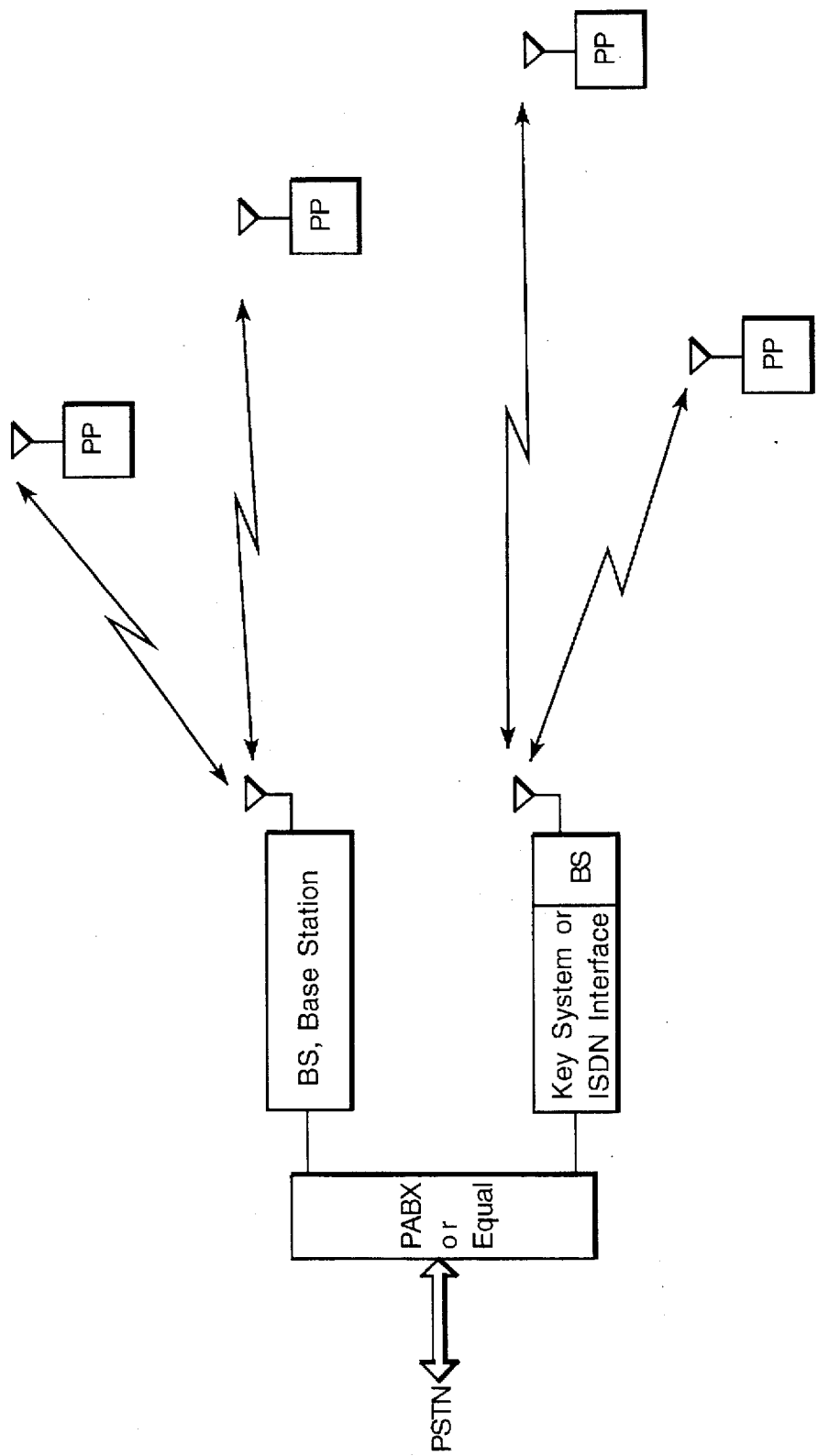
FIG. 2 is a block diagram of two alternate wireless OCDMA PABX (intra-office) systems incorporating the invention.

The invention is applicable for use in a simple single wireless telephone application as might be used in a private home, in a single user office, or, in fact, any other single user application. FIG. 2 illustrates a Base Station (BS) interfacing directly to a PBX and providing an RF interface to one or multiple portable parts (PP), or handsets, This system can be used in the home, with either a single or multiple independent PPs, or in a multiple user single office environment which does not require the additional features of a key system application.

The OCDMA wireless invention is also applicable for use in a more complex multi-user system environments, for example a key system application useful for supplying telephone service to the personnel in a shared office, a small business—or a company department application requiring such features as intra-office communications, paging, conference calls, and other features typically found in key systems. This type of system is also illustrated in FIG. 2 assuming either a proprietary or standard ISDN interface.

Figure 3:
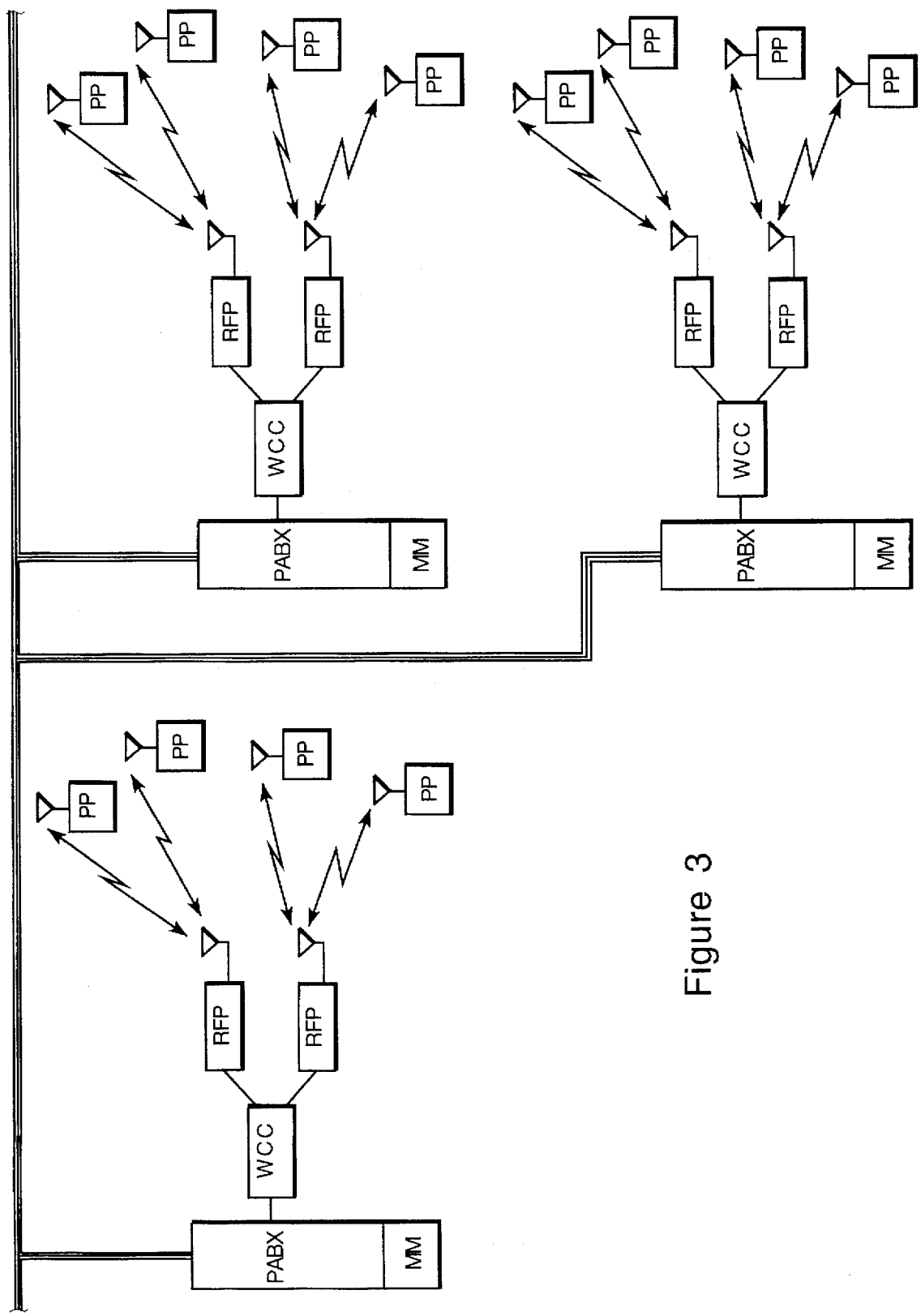
FIG. 3 is a block diagram of a wireless OCDMA PABX (inter-office) wide area network (WAN) or Telepoint application system incorporating the invention.

Inter-Office Systems Wide Area Networks (WAN), and Telepoint Applications:

A larger system such as what would be needed to service a number of departments in a single larger company can also be implemented using the OCDMA invention. A typical system is illustrated in FIG. 3. Note that there we may be multiple PBXS, each of which interfaces to one or more wireless cluster controllers (WCCs) each of which supports multiple portable ports PPs.

In an inter-office system a single PBX can be provided to support a large group of users. In fact depending on the size building, a single PBX could support the entire building. Alternately, there could be several PBXs in a single building. In any case, each PBX would be supporting one or more wireless cluster controllers (WCCs) each of which would be supporting a group of users, The area covered by a particular radio fixed part RFP would be identified as its cell. In this system the users would generally be expected to have roaming and handover capability when moving between one cell area and another. In a very large system covering a very large building, multiple buildings or a large campus area, this system can be said to become a wide area network or WAN system. In addition, when deployed in a public area for the purpose of providing a private system to provide telephone service to the general public, the same configuration can then be seen to become a Telepoint system application.

Wireless Local Loop Systems

Another area of OCDMA system application is the local loop requirement. FIG. 4 illustrates two of many different levels of service which can be provided in this application. FIG. 4A shows what the system would look like when servicing a high density user (subscriber) environment with only telephone service. The RFPs are deployed so as to cover a defined geographic service area (cell). The service provided need not be limited to telephone service only. It could be expanded to include such things as FAX and PC interface capability.

FIG. 4(b) illustrates a suburban application which would be required to support not only single telephone user requirements but the needs of business as well in which case the need for such additional features such as FAX and PC interface requirements become a must. Of course any system can contain the capability of providing a mixture of the various levels of service and throughput capability.

Figure 5:
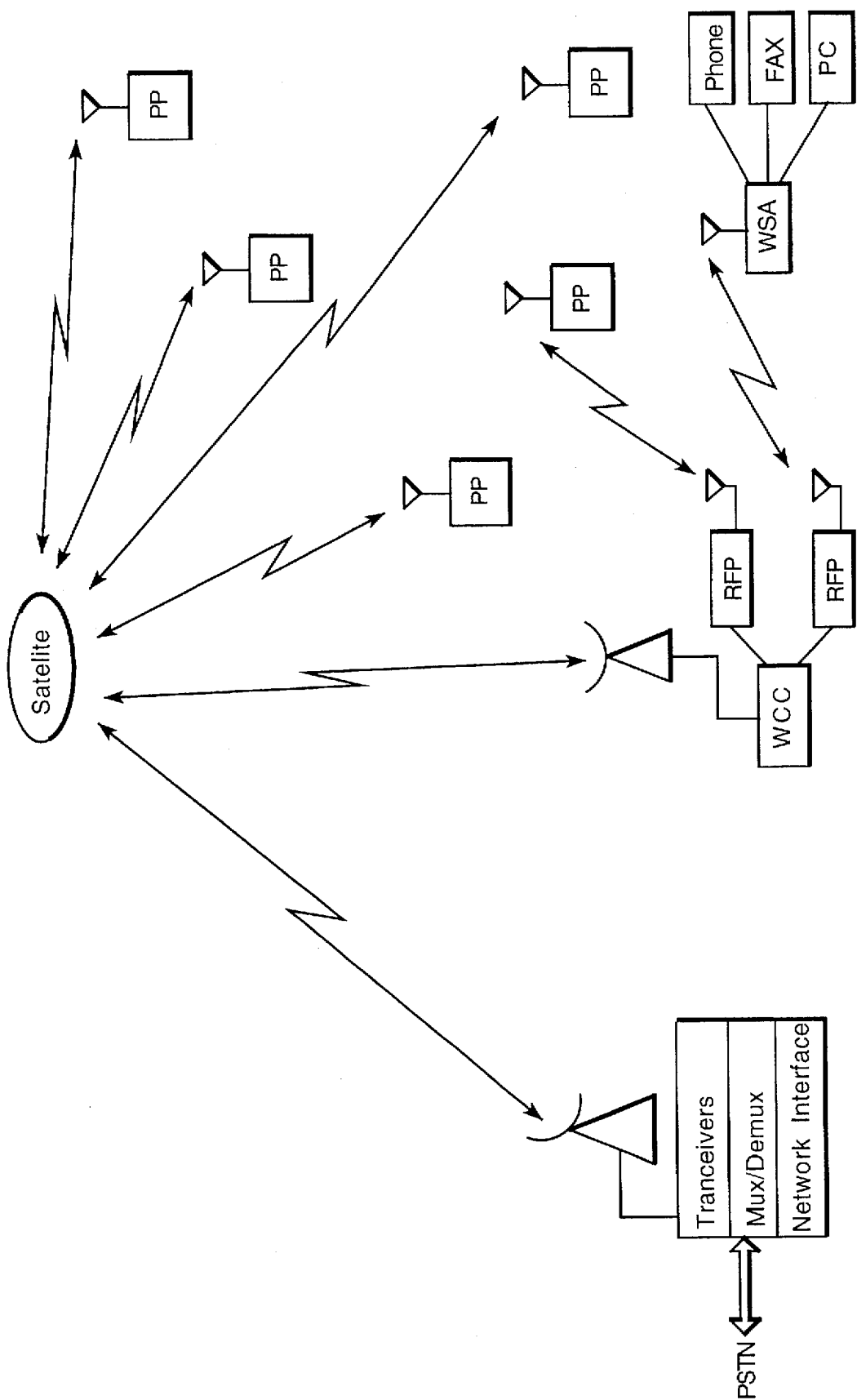
FIG. 5 is a block diagram of a satellite wireless OCDMA telephone system incorporating the invention.

Satellite System Applications:

FIG. 5 illustrates an example of a satellite system configuration using OCDMA. Shown here is a Gate Way terminal to satellite link on one side with a number of subscribers with different capabilities on the other side. Note that some subscriber PPs communicate directly with the satellite while others communicate through a subscriber terminal which then distributes the signal to a WCC, or WCCS, and thence to RFPs and on to the subscriber facilities directly to a PP or through a wireless subscriber adapter WSA. It should be noted that the system efficiencies and advantages defined in the above referenced patents and applications are completely carried over into all these varied applications.

Figure 6:
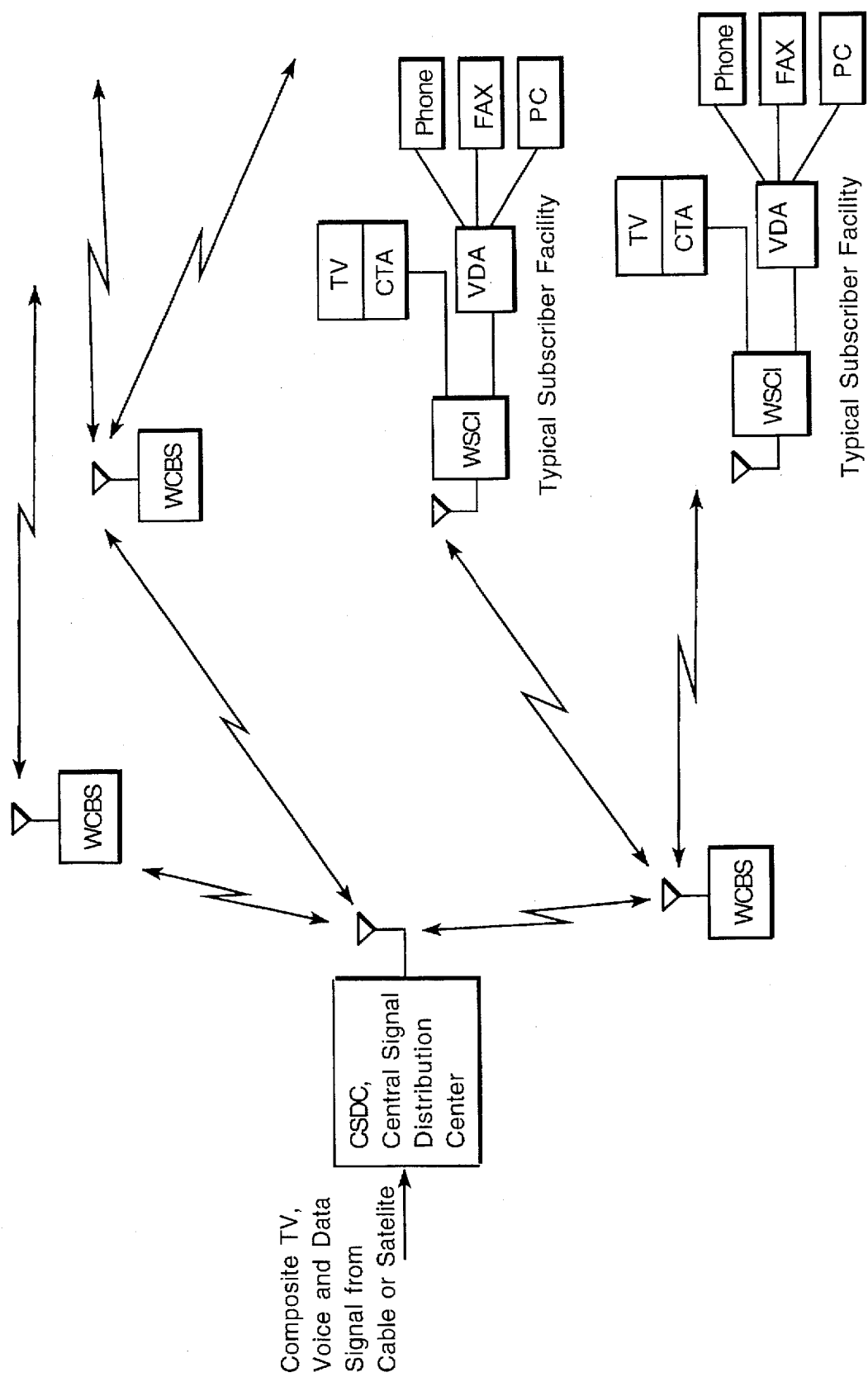
FIG. 6 is a block diagram of a typical voice over cable to wireless voice distribution system incorporating the invention.

Voice-Over-Cable to Wireless Voice Distribution System:

An alternate method of routing voice signals to end users is to provide it as a part of the composite cable television signal delivered to cable television subscribers. A typical wireless/cable distribution system configuration is illustrated in FIG. 6. The signals delivered to the subscribers are broadcast from a wireless cable base station (WCBS) using OCDMA modulation and communication techniques over a geographical area defined as the cell service area, or coverage area for the WCBS. These WCBSs receive their input via an RF transmission link from a central signal distribution center (CSDC) The CSDC receives its input by way of either a cable distribution system or, alternately, a satellite link distribution system. All the signals in all these links, other than the television signals, are transmitted using OCDMA technology as previously patented. The WCBS rebroadcasts its signal to its assigned subscriber area where it is received by wireless subscriber cable interface units (WSCI) at each subscriber facility. The WSCI provides signals to a cable television adapter (CTA) unit and a voice and data adapter unit. The CTA provides the signal for television reception and the VDA provide the signal for telephone, FAX, PC interface data or whatever other digital data may be required by the subscriber.

While preferred embodiments of the invention have been shown and described, it will be appreciated that various other embodiments, modifications and adaptations of the invention will be readily apparent to those skilled in the art.

What is claimed is:

1. A wireless OCDMA communication system in which there is a cluster of base stations (BS), and radio fixed parts (RFP), which are selectively controlled by a wireless cluster controller (WCC), said OCDMA communication system including frames of a time division duplex spread spectrum signal for two-way voice and/or data transmission, and a plurality of handsets, portable parts (PPs), and complex subscribers, each adapted to communicate selectively with said BS, or RFP, using said OCDMA communication system, and means to implement a variety of system configurations and provide a variety of levels of services, comprising:

a) a single base station and radio fixed part, and single portable part system for providing conventional telephone service, b) a single base station and radio fixed part, and multiple portable parts for providing communications with a public switched network telephone, c) a single base station and radio fixed part, and multiple portable parts for providing key system service with a proprietary interface or with an ISDN interface, d) multiple base stations and radio fixed parts, and multiple portable parts for providing key system service with the capability of roaming and handover over an extended multiple cell service area, e) multiple base stations and multiple radio fixed parts, and multiple portable parts interfacing to one or more PBXs for providing wide area network (WAN) coverage system capability, for a private network, and a Telepoint system capability for a public network, f) multiple base stations and multiple radio fixed parts, and multiple portable parts for providing a wireless local loop capability, g) multiple base stations and multiple radio fixed parts, and multiple portable parts together and subscriber terminals interfacing to the PSTN via satellite links for providing a wireless OCDMA telephone system capability, and h) multiple base stations and multiple radio fixed parts, and multiple portable parts and subscriber terminals together with a wireless cable distribution system for providing wireless voice and data distribution system initially distributed via cable.

\* \* \* \* \*